United States Patent
Mansouri Rad et al.

(10) Patent No.: US 10,784,979 B2
(45) Date of Patent: Sep. 22, 2020

(54) SYSTEM AND METHOD OF PROVIDING DARK SECTION FREE TRANSPORT NETWORKS

(71) Applicants: Mohammad Mehdi Mansouri Rad, Kanata (CA); Hamid Mehrvar, Ottawa (CA)

(72) Inventors: Mohammad Mehdi Mansouri Rad, Kanata (CA); Hamid Mehrvar, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/459,610

(22) Filed: Mar. 15, 2017

(65) Prior Publication Data
US 2018/0270009 A1   Sep. 20, 2018

(51) Int. Cl.
| H04B 10/073 | (2013.01) |
| H04J 14/02 | (2006.01) |
| H04B 10/032 | (2013.01) |
| H04B 10/079 | (2013.01) |
| H04B 10/077 | (2013.01) |
| H04Q 11/00 | (2006.01) |

(52) U.S. Cl.
CPC ........ *H04J 14/0212* (2013.01); *H04B 10/032* (2013.01); *H04B 10/0773* (2013.01); *H04B 10/07953* (2013.01); *H04B 10/07955* (2013.01); *H04Q 11/0005* (2013.01); *H04Q 11/0062* (2013.01); *H04Q 2011/0016* (2013.01); *H04Q 2011/0083* (2013.01)

(58) Field of Classification Search
CPC .......................... H04B 10/073; H04J 14/0201
See application file for complete search history.

(56) References Cited

U.S. PATENT DOCUMENTS

| 9,252,913 B2 | 2/2016 | Al Sayeed et al. |
| 2004/0096216 A1* | 5/2004 | Ito ...................... H04B 10/0775 398/33 |
| 2007/0036548 A1 | 2/2007 | Duan et al. |
| 2007/0217794 A1* | 9/2007 | Sakamoto .............. H04B 10/07 398/177 |
| 2009/0162052 A1 | 6/2009 | Xia et al. |
| 2011/0141552 A1* | 6/2011 | Ghera ................ H04B 10/2942 359/334 |

(Continued)

FOREIGN PATENT DOCUMENTS

| CN | 101192887 A | 6/2008 |
| CN | 101227247 A | 7/2008 |

(Continued)

*Primary Examiner* — Shi K Li

(57) ABSTRACT

A wavelength selective switch (WSS), reconfigurable optical add-drop multiplexer (ROADM) and methods of determining a condition of a domain network section are provided. The WSS and ROADM include a light source for sending an optical signal having a characteristic. The method comprises instructing a light source to send an optical signal across an optical link, obtaining measurements of characteristic values of the optical signal received at and sent by components along the domain network section, comparing the characteristic values to pre-defined limits, and determining the condition of the domain network section based on the characteristic values.

15 Claims, 15 Drawing Sheets

(56) References Cited

U.S. PATENT DOCUMENTS

| | | | |
|---|---|---|---|
| 2013/0236169 A1* | 9/2013 | Gaudette | H04B 10/0793 |
| | | | 398/25 |
| 2014/0112660 A1* | 4/2014 | Al Sayeed | H04J 14/0221 |
| | | | 398/38 |
| 2014/0140692 A1 | 5/2014 | Oda et al. | |
| 2014/0205281 A1 | 7/2014 | Sone et al. | |
| 2014/0328583 A1* | 11/2014 | Al Sayeed | H04J 14/0289 |
| | | | 398/7 |
| 2014/0348464 A1 | 11/2014 | Kamura et al. | |
| 2015/0208146 A1* | 7/2015 | Younce | H04Q 11/0066 |
| | | | 398/21 |
| 2016/0072575 A1 | 3/2016 | Al Sayeed et al. | |

FOREIGN PATENT DOCUMENTS

| | | |
|---|---|---|
| CN | 101933256 A | 12/2010 |
| CN | 103001695 A | 3/2013 |
| CN | 103973390 A | 8/2014 |
| EP | 2728778 A2 | 5/2014 |

\* cited by examiner

Instruct LS to send optical signal across domain network
865

For each section in the domain network:
Check performance readings to ensure that the section is healthy
870

Instruct LS to remove the optical signal when the WDM channel is set up
880

FIG. 8B

For each section in the domain network

Tune the LS optical signal to a wavelength for the section
872

Check the performance readings to ensure section is healthy for that wavelength
874

Next section

FIG. 8C

SYSTEM AND METHOD OF PROVIDING DARK SECTION FREE TRANSPORT NETWORKS

FIELD OF THE INVENTION

The present invention pertains to the field of network communications, and in particular to a system and method of providing dark section free transport networks.

BACKGROUND

Sometimes a section of an optical network may not be visible to a network management layer. These sections are termed "dark" sections. Dark sections with no traffic are challenging for a network management layer. Dark sections may be experienced in newly created sections of a network where no traffic has yet been established in a section. Dark sections may also be experienced due to a network failure, or due to component malfunctions in the field (such as when the fiber is cut). When there is no wavelength-division multiplexing (WDM) channels in an optical section of a network, a photonic management layer of the network may not be able to identify potential problems such as high loss, reflections, poor connectors, splicing, and component malfunctions or pertinent failures. This inability to identify potential problems may increase risks for reliability and guaranteed service level agreements during traffic WDM channel setup or network failure recovery. This inability to identify potential problems may also increase network response time for dark sections during reconfigurations (capacity scales) due to latency involved for channel establishment time.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a system and method of dark section free transport network of a communications network.

In accordance with embodiments of the present invention, there is provided a wavelength selective switch (WSS). The WSS comprises a light source for sending a pilot optical signal, a multiplexer for receiving a plurality of input signals and for outputting a multiplexed output signal, a coupler for receiving the pilot optical signal and the multiplexed output signal, and for outputting a WSS output signal, and a demultiplexer for receiving a combined input signal and outputting a plurality of split signals.

In accordance with embodiments of the present invention, there is also provided a reconfigurable optical add-drop multiplexer (ROADM). The ROADM comprises a controller interface for receiving instructions from a controller, a WSS for receiving a combined input optical signal and for outputting a WSS output signal, an amplifier for amplifying the power level of the output optical signal, and an add-drop bank for receiving at least one single optical signal from the combined input optical signal. The light source is integrated in at least one of the WSS, amplifier and add-drop bank for sending a pilot optical signal.

In accordance with embodiments of the present invention, there is also provided a method of determining a condition of a domain network. The method comprises instructing a light source to send an optical signal across an optical link of a domain network section comprising a plurality of components, obtaining characteristic values of the optical signal at each component, and determining the condition of the domain network section based on the characteristic values. The link extends from a first ROADM in the domain network section to a second ROADM in the domain network section.

In accordance with embodiments of the present invention, there is also provided a method of determining that a new wavelength-division multiplexing (WDM) channel may be added to a domain network. The method comprises instructing a light source to send an optical signal across the domain network, and checking that the performance readings are within pre-defined limits.

In accordance with embodiments of the present invention, there is also provided a method of monitoring a condition of an optical network. The method comprises instructing a light source that emits optical signals having a known characteristic to send the optical signal throughout the optical network, instructing receivers in nodes in the optical network to monitor the optical signal they received, receiving monitoring readings from the nodes and comparing the monitoring readings to an expected result based on the known characteristic, and evaluating a condition of each domain network section by comparing the monitoring readings to pre-defined limits for each domain network section.

BRIEF DESCRIPTION OF THE FIGURES

Further features and advantages of the present invention will become apparent from the following detailed description, taken in combination with the appended drawings, in which:

FIG. 8B illustrates, in a flowchart, another example of determining that a new WDM channel may be added to a domain network, in accordance with embodiments of the present disclosure;

FIG. 8C illustrates, in a flowchart, an example of determining that performance readings are within pre-defined limits, in accordance with an embodiment of FIG. 8A;

It will be noted that throughout the appended drawings, like features are identified by like reference numerals.

DETAILED DESCRIPTION

Embodiments of the present invention are directed towards a system and method of providing dark section free transport networks.

Dark sections may appear in a network after the deployment/installation of new nodes and fiber plants in the network. The new nodes and fiber plants may have been deployed/installed when new optical sections are deployed. Furthermore, wavelength-division multiplexing (WDM) traffic channels may not yet have been added. Dark sections may also appear in a network after a network/component failure or malfunction (e.g., when a fiber is cut). After such events, a restoration typically happens where WDM traffic channels are re-routed to new viable available paths. Dark sections may also appear in a network after a network maintenance operation. Optical sections may experience a temporary darkness due to planned or unplanned actions by network personnel. The total cost of a dark section may be expressed as the time required to light an optical section. The complexity involved in algorithms and actions taken by photonic layer management software may directly affect the network outage and network down-time and should be minimized across the network. More importantly after the network restorations, when the corresponding fault (e.g. cut) is repaired, the optical section should be validated in terms of viability before any further action is taken. Actions may include reversion (i.e., re-routing WDM traffic to their home path) or adding new WDM traffic channels.

Figure 1:
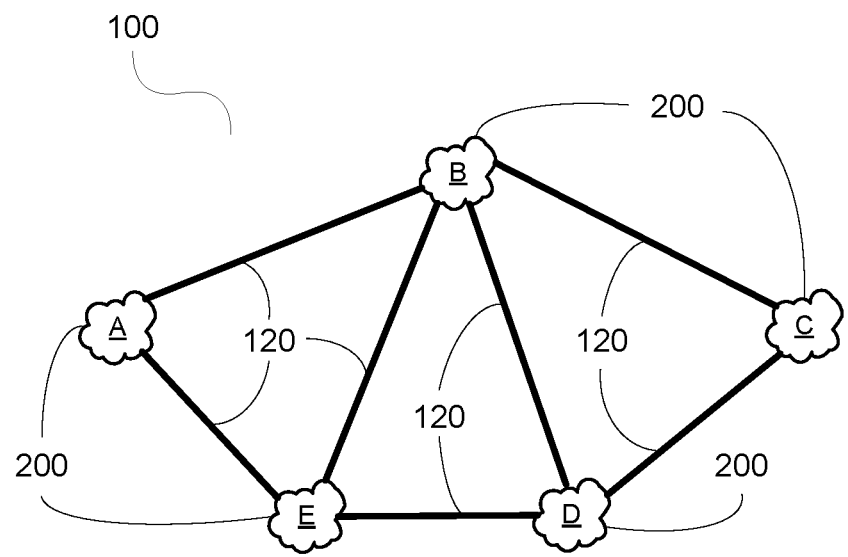
FIG. 1 illustrates, in a network diagram, an example of a multi-domain network.

FIG. 1 illustrates, in a network diagram, an example of a multi-domain network 100. The multi-domain network 100 comprises at least two domain networks 200 and optical links 120 between the network domains 200. While five domain networks 200 (A to E) are shown in FIG. 1, it is understood that any plurality of domain networks 200 with any combination of optical links 120 may be configured.

Figure 2:
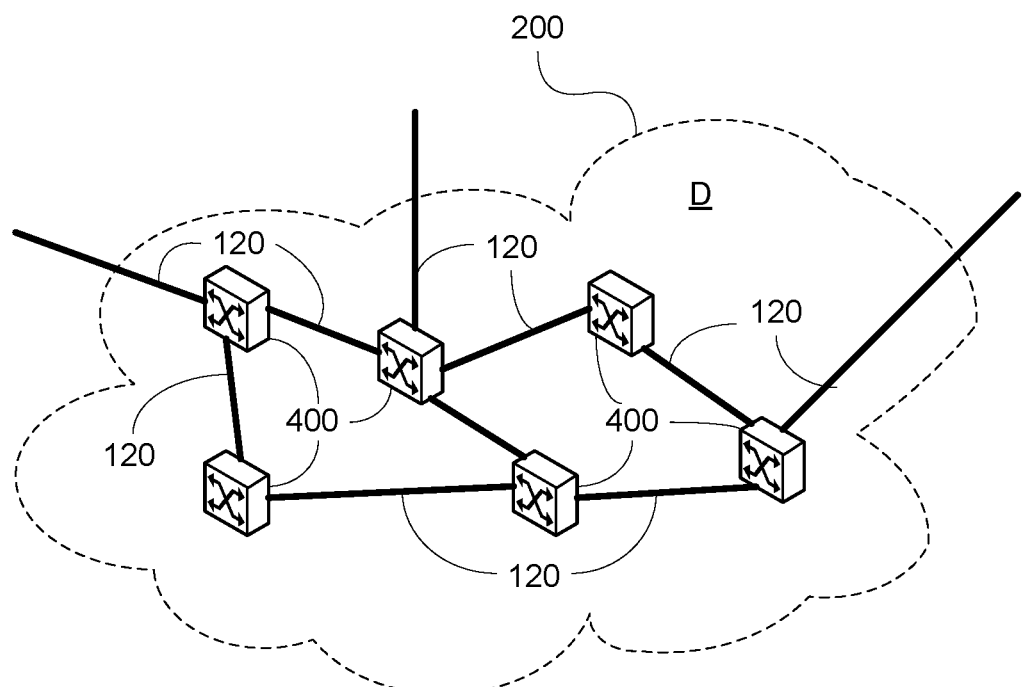
FIG. 2 illustrates, in a network diagram, an example of a domain network, in accordance with an embodiment of the multi-domain network.

FIG. 2 illustrates, in a network diagram, an example of a domain network 200, in accordance with an embodiment of the multi-domain network 100. The domain network 200 comprises at least one reconfigurable optical add-drop multiplexer (ROADM) 400 and optical links 120 between the ROADMs 400. Some ROADMs 400 may have optical links with other ROADMs 400 or other components of a neighbouring domain network 200 in the multi-domain network 100. While six ROADMs 400 have been shown in FIG. 2 (representing domain network D of FIG. 1), it is understood that any number of ROADMs 400 with any combination of optical links 120 may be configured.

Figure 3:
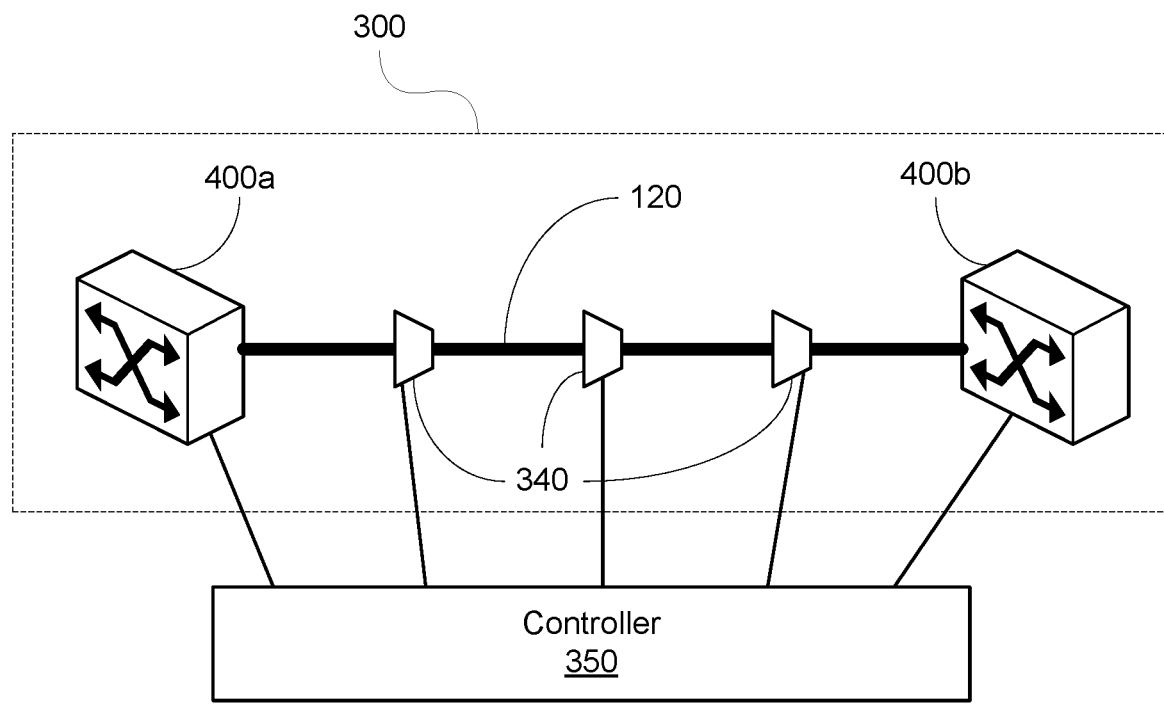
FIG. 3 illustrates, in a component diagram, an example of a network section, in accordance with an embodiment of the domain network.

FIG. 3 illustrates, in a component diagram, an example of a domain network section 300, in accordance with an embodiment of the domain network 200. The domain network section 300 comprises a first ROADM 400a optically coupled to a second ROADM 400b via an optical link 120. One or more amplifier nodes 340 may be placed along the optical link to adjust for any attenuation in the optical fiber. A controller 350 may be connected to the ROADMs 400a, 400b and to the amplifiers 340. The controller 350 may operate the ROADMs 400 and amplifier nodes 340 to send optical signals via the optical links 120. The controller 350 may also read and/or receive the input power ($P_{in}$) and the output power ($P_{out}$) at an amplifier 340 or ROADM 400. The controller 350 may be a software defined network (SDN) controller that implements a network monitoring and management software layer. The functionality of the controller 350 may also partially or fully reside on nodes associated with the optical section (e.g., ROADMs 400 or amplifiers 350).

When light (i.e., a WDM channel) is propagating through the optical link 120, the output power at the first ROADM 400a should be approximately the same as the input power at a first amplifier 340 down the optical link 120 less the attenuation attributed to that optical link segment. Similarly, the output power at a first amplifier 340 should be approximately the same as the input power at the next amplifier 340 down the optical link 120 less the attenuation attributed to that optical link segment. Similarly, the output power at the last amplifier before the second ROADM 400b should be approximately the same as the input power at the second ROADM 400b down the optical link 120 less the attenuation attributed to that optical link segment. By reading the power outputs and power inputs at components along the optical link 120 of the domain network section 300, the controller 350 may confirm whether the domain network section optical link segments are lit or dark. The controller 350 may then infer that the network section 300 is lit when all optical links segments have light. The measurements available due to the presence of light, will enable the controller 350 to validate the optical section health conditions by comparing to the requirements for green fields or referenced values for post-fault repair scenarios. The controller 350 may also be responsible for other adjustments and global sectional control including power adjustment, gain setting and monitoring.

It is noted that a domain network section 300 does not have to have zero light to be considered as being "dark". If the input power at the operating wavelength window of operation at a component, e.g., an amplifier, is less than a predefined amount of dBm then the optical link segment leading up to that component may be considered as being "dark". For example, the input power can be less than −28 dBm or less than −32 dBm. That is, under normal operations components such as ROADMs 400 and amplifiers 340 may be set to ensure a minimum amount of output power for optical signals that are sent by that component down the optical link 120. In most cases for amplifiers present in the optical link (for instance those in components 340 and 400), this means that if the power measured is below a certain threshold, then the amplifiers will not operate (i.e., they do not provide the expected amplification as provisioned by the controller 350). Such a threshold may be provisional, technology dependent and design dependent. The threshold may also depend on the specification of the corresponding components used in the optical section. While values of −28 dBm or −32 dBm, noted above, are typical values, they are not necessarily universal values and may vary from module to module of the same vendor, or product release of the same module.

Besides these thresholds which affect the operations of active amplifier components, in general there are other thresholds which may be used to indicate the validity of the data measured at each point in the section 300. Measurements reported below these values are considered stale and unreliable. In practice, when the section is dark (especially when amplifiers do not operate because of very low input powers), most data readings are stale and unreliable. Hence, signals having power outputs below minimum thresholds are not used for the purpose of optical section evaluation.

A light source (LS) may be configured to light an optical link 120 between two ROADMs. The LS may come from an external optical signal received by the first ROADM 400a and sent to the second ROADM 400b. The LS may also (additionally and/or alternatively) be integrated with at least one ROADM 400. The only requirement on the LS is its operation window (wavelength) which should be the same as the active elements in the optical sections. The active elements include the ROADM 400 and the amplifiers 340. The presence of a LS signal ensures that a lit section and can give the controller 350 readings regarding the overall health of the corresponding section 300. Typically, the C band (~1530 nm to ~1570 nm) is the operating window of most telecommunication equipment. A LS in the C band can be unmodulated since no data is needed to be carried by the LS for this purpose. Hence, a steady continues wave (CW) light source may serve the purpose. This simplifies the design and reduces the cost of the LS for this scheme. Since the LS may be configured to provide a minimum amount of light power to the optical section 300, ROADM 400, amplifiers 340, and optical links 120, the LS is flexible in terms of optical power output as well (i.e., further cost reduction). It is noted that the optical supervisory channel (OSC) practiced in the industry operate outside of the operating window of amplifiers (e.g., 1510 nm). OSC channels carry the topology/telemetry control channel data between nodes (400 and 340) and are added and dropped at each node. Therefore, OSC in a section does not provide the more comprehensive view of the physical layer. This means that an optical section can be dark while having OSC running between all its nodes.

The output power of the LS may depend on the technology available for the optical section 300, the operating requirement of the amplifiers within the link in the ROADM 400 and the amplifier nodes 340, and the loss budget of each optical link 120. For instance, in sections with 20 dB of optical link loss, and amplifiers with −30 dBm minimum input power requirement for normal operation, the output power of the LS to the line should be at least −10 dBm (excluding any reliability margin). Such a calculation may be updated considering some engineering requirements for the patch panel loss, connector loss, ROADM loss, and deployment of different amplifiers with different technologies (different required minimum input powers), non-uniform optical link loss as well as desired margin of operation. By engineering across the network, a desired power level for LS can be set to cover many scenarios. Typically, 0dBm power seems to serve the majority of current networks, which implies no complications on the LS hardware. Thus, inexpensive solutions may be offered for either an integrated or external LS.

Typically, lasers used in coherent modules, especially for 100G cards, have 10-100 MHz bandwidths, i.e., narrow linewidths for desired performances. In embodiments of the present disclosure, a few GHz is acceptable as there is no modulation involved. Moreover, there is no modulation required for the LS, so the LS may be continuous wave (CW) LS. The LS may be operating at the window of the ROADM amplifier 440 (typically in the C band between 1530 nm and 1570 nm) and may keep optical link amplifiers 340 "ON" and operating (providing amplification). The center wavelength (frequency) of the LS may be chosen in a way that has minimal (or no effect) on the performance of the network. For instance, one possible option is the middle wavelength between adjacent WDM channels where the impact is minimized due to the filtering effect of the WSS or Coherent transponders.

Figure 4:
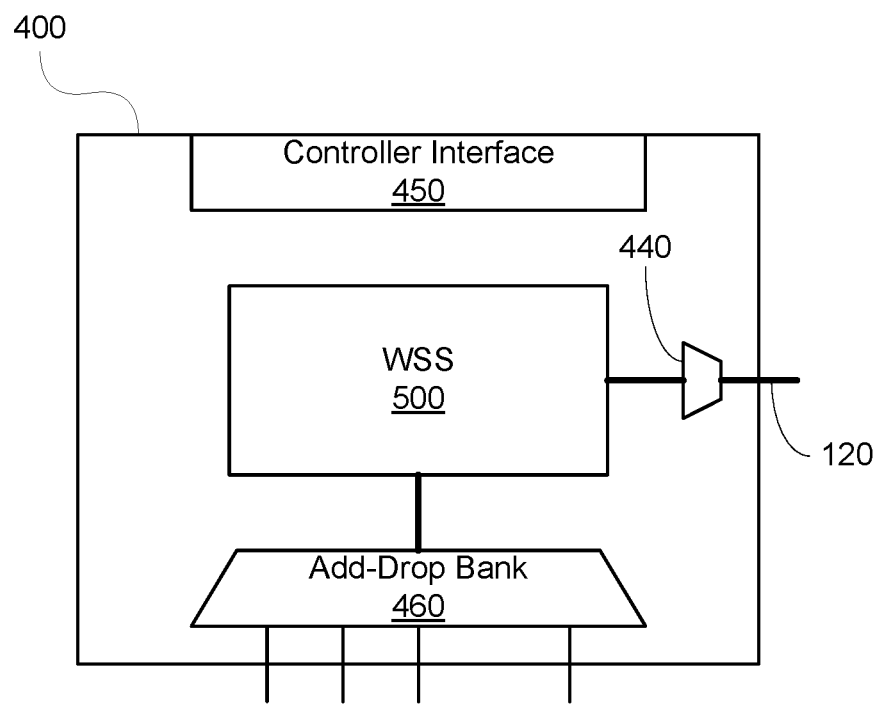
FIG. 4 illustrates, in a component diagram, an example of a reconfigurable optical add-drop multiplexer (ROADM), in accordance with an embodiment of the domain network.

FIG. 4 illustrates, in a component diagram, an example of a ROADM 400, in accordance with an embodiment of the domain network 200. The ROADM 400 comprises a wavelength selective switch (WSS) 500, a controller interface 450, at least one ROADM amplifier 440 and a wavelength division multiplexer (WDM) channel add-drop bank 460. Other modules, such as patch panels, dispersion compensation modules, etc., are not shown from FIG. 4 for the purpose of simplicity of presentation. The controller interface 450 may be connected to the controller 350 for receiving operating instructions from the controller 350 and for sending diagnostic information to the controller 350. One or more ROADM amplifiers 440 may be placed before one or more output ports of the ROADM 400 to set the output power for an optical signal output by the WSS 500 via an optical link 120. Any component or module of the ROADM 400 may be integrated with a light source (LS). For example, the WSS 500 may include an integrated light source. Additionally, and/or alternatively, the WSS 500 may receive an optical signal from a light source via one of its input ports. The WSS 500 receives optical signals from an optical link 120, and sends optical signals out an optical link 120, via an input/output port.

A light source (LS) may be integrated in the WSS 500 to be employed to light the section 300 to turn amplifiers 340 "ON". LSs, including inexpensive LSs operating at the C band (1530 nm to 1570 nm), may be integrated into any of the ROADM 400 components or modules. For example, when a LS is implemented into a WSS 500, full section light-up and diagnosis before WDM channel setup is enabled. Different wavelengths for the section light-up may be used for either direction. In another example, when the LS is integrated into the add-drop banks 460, section and nodal connectivity and functionality may be evaluated prior to channel turn-up. In another example, when the LS is integrated in a separate monitoring and troubleshooting source, the monitoring source may be supported separately at the interests of a customer to have the feature. Offerings may be in the form of a pluggable with multiple output ports to support multiple degrees. In such cases, a card with multiple or individual LSs may be configured to light different degrees of a multi-degree node. In a multi-pluggable card for the LS, the card may have multiple empty slots (or sub-slots) where each is for one individual pluggable to support one degree in the node. Per request, the pluggable may be deployed and the corresponding LS may be employed for the desired direction. This supports on-the-fly upgrade of the feature as the network expands and degrees increase. This is similar to FIG. 12, below, with the difference that module 1210 has multiple slots each for one pluggable LS source for this purpose.

A WSS that does not support a broadcast feature in its demultiplexer may be configured/programmed to perform routing functionality of the LS light for a desired demultiplexer direction/port to cover the network and have all sections lit. Having the network lit in this case depends on the meshiness of the network. Alternatively, the WSS may be configured to a desired degree for the desired functionality.

Figure 5:
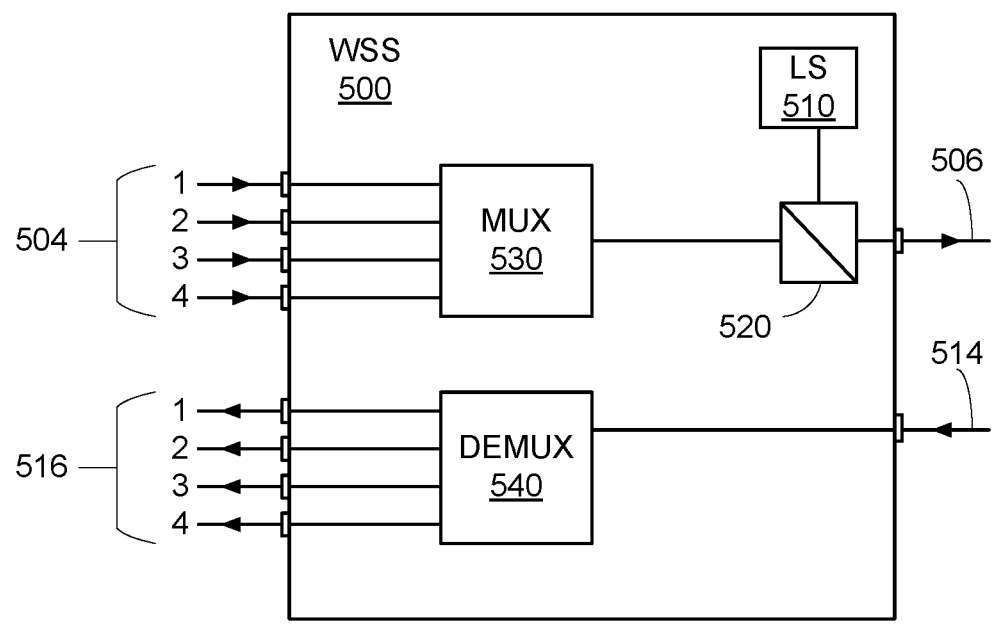
FIG. 5 illustrates, in a component diagram, an example of a wavelength selective switch (WSS), in accordance with embodiments of the ROADM.

FIG. 5 illustrates, in a component diagram, an example of a WSS 500 having an integrated LS, in accordance with embodiments of the ROADM 400. Wavelength selective switches (e.g., configured as 1×2, 1×5, 1×9, etc.) are widely used in ROADMs 400 to support a variety of nodal architectures (e.g., mainly colorless and directionless (CD), and colorless, directionless and contentionless (CDC)). The WSS 500 comprises one or more multiplexer (MUX) input ports 504 for receiving one or more optical signals and for outputting a multiplexed output signal. FIG. 5 shows a WSS 500 having a 1×4 configuration. It is understood that other configurations are possible, including 1×20 and larger configurations. The multiplexer input ports 504 are connected via optical fiber to a multiplexer 530. The multiplexer 530 may provide directional filtering and wavelength-selective switching functionality for optical signals received at the one or more multiplexer input ports 504. The multiplexer 530 outputs an optical signal to an optical coupler, e.g. a wavelength-selective coupler (WC) 520. The WC 520 allows optical signals to be output via a multiplexer output line 506.

An integrated light source (LS) 510 may be added to the WSS 500. The LS 510 may be coupled to the multiplexer output line 506 via the WC 520. In some embodiments, the LS 510 signal may always be present in the multiplexer output line 506 which leads to the optical link 120 (i.e., a "pilot light" for the optical link 120). Thus, in these embodiments, the optical link 120 from the ROADM 400 having this WSS 500 always includes the LS signal (i.e., the optical links 120 and amplifiers 340 in a corresponding domain network section 300, are not "dark"), unless there is a malfunction with one of the components (e.g., there may be a malfunction in one or more of the LS 510, WC 520, WSS 500, ROADM 400 component or optical link amplifier 440, or there may be a cut in the multiplexer output line 506 or in the optical link 120). It is noted that the WC 520 may be replaced with an internal switch (not shown) to send the LS signal to the multiplexer output line 506 on-demand. An internal switch would allow for the LS signal to be modulated rather than "always ON". This allows the controller 350 to light the lines in the section using LS 510 when required.

The WSS 500 may also include a demultiplexer (DE-MUX) input line 514 which is coupled to a demultiplexer 540. The demultiplexer 540 may provide active wavelength-selective switching or a passive wavelength-selective splitting of the optical signal received via the demultiplexer input line 514. Each separated signal copy may be output via one or more demultiplexer output ports 516 and may be fed to other directions for express channels or to the add/drop banks 460 for add/drop purposes. While the multiplexer direction uses the directional selective filtering and switching for low port counts such as 1×2, 1×4, and 1×9, higher port WSS architectures such as 1×20 may employ the same structure/technology for the multiplexer and the demultiplexer to minimize the cost for demultiplexer signals. It should be noted that in some embodiments, a passive splitter may be used in place of the demultiplexer 540.

Figure 6:
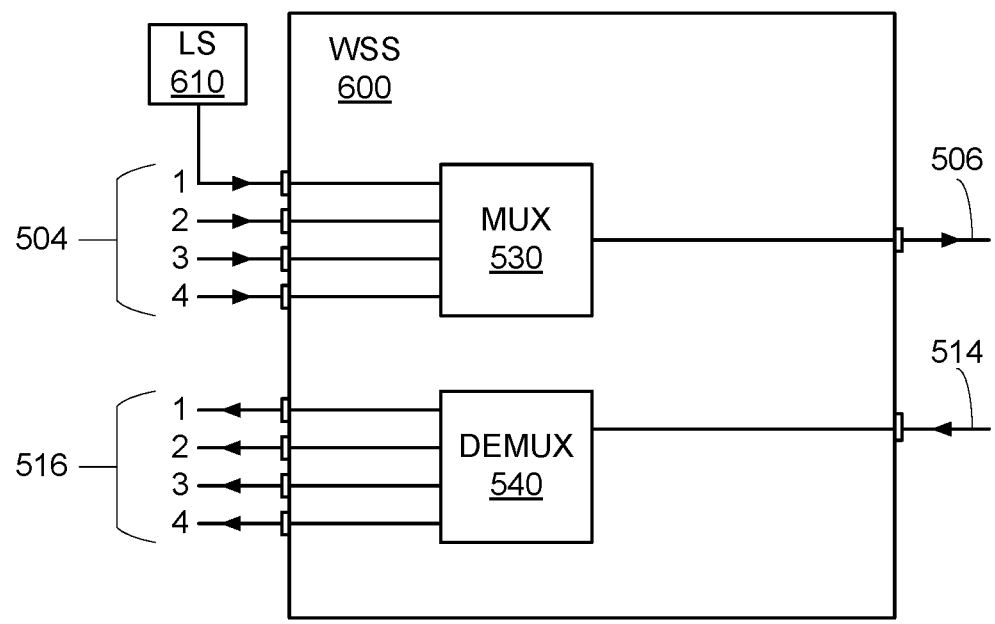
FIG. 6 illustrates, in a component diagram, another example of a WSS using an external LS, in accordance with an embodiment of the ROADM.

FIG. 6 illustrates, in a component diagram, an example of a WSS 600 using an external LS, in accordance with an embodiment of the ROADM 400. The WSS 600 comprises the multiplexer input ports 504, the multiplexer 530, the multiplexer output port 506, the demultiplexer input port 514, the demultiplexer 504 and the demultiplexer output ports 516. An external LS 610 having a wavelength $\lambda_{LS}$, may be coupled to one of the multiplexer input ports 504. For legacy WSS hardware, an existing multiplexer port (mux port) 504 may be used. This implies a port utilization deficiency since one port is used for the LS 610 per WSS. In this example, a 25 percent port utilization deficiency is shown (one of four ports in the 1×4 configuration is used for the LS 610 signal). In larger configurations, such as 1×20, the port utilization deficiency is lower. For example, in a 1×20 configuration, only a 5 percent port utilization deficiency would be experienced. Newer WSS hardware typically have more ports, such as 1×20 WSS. Considering the fact that the multiplexing required for a LS is not the same as WDM channels, a designated port for LS signal may be added to the newer designs of WSS (with either high port counts or existing regular port counts). For a high port WSS, adding an extra port for the purpose of the LS 610 imposes a negligible cost. For example, using one out of 20 ports (or adding 1 port to have a 1×21 configuration) is a negligible additional cost to an overall design and fabrication of a WSS. This is due to the fact that the newly added port would only need to couple the LS signal to the output multiplexer port (i.e., no filtering and switching would be needed as compared to other ports used for add/drop or expressing WDM traffic channels).

In either implementation of the WSS and LS (i.e., LS 510 integrated into WSS 500, or LS 610 external to WSS 600), a controller 350 may be connected to the components for operational and monitoring purposes. To check that a domain network section 300 is lit, the controller 350 may instruct a first ROADM 400a to only send the optical signal generated by the LS 510,610 through the optical path 120 to the second ROADM 400b. The controller 350 may then compare the output power ($P_{out}$) of each component with its input power ($P_{in}$) or the input power of the next component along the optical path 120. For example, for amplifiers, comparing the input power and output power measures the provided gain which can be compared with the expected provisioned values or the values expected by the controller. The power readings to the link 120 (usually $P_{out}$ of the previous amplifiers are used) and the power reading at the end of the optical link 120 (usually $P_{in}$ of the next amplifier is used) may be used to measure the real time link loss $L_{loss}$ experienced, i.e. $L_{loss}=P_{out}-P_{in}$. Utilizing this data, the link budget of the optical link 120 may be evaluated and or compared with the baseline values. Such evaluations may be extended to the back-reflection power readings (usually available at the amplifiers) to measure the total link reflection as an indication of link health status. In general, optical link viability and health, especially after repair and fault recovery, may be performed by comparing the new readings with the previous readings and making sure that the section is in pre-fault conditions.

Figure 7A:
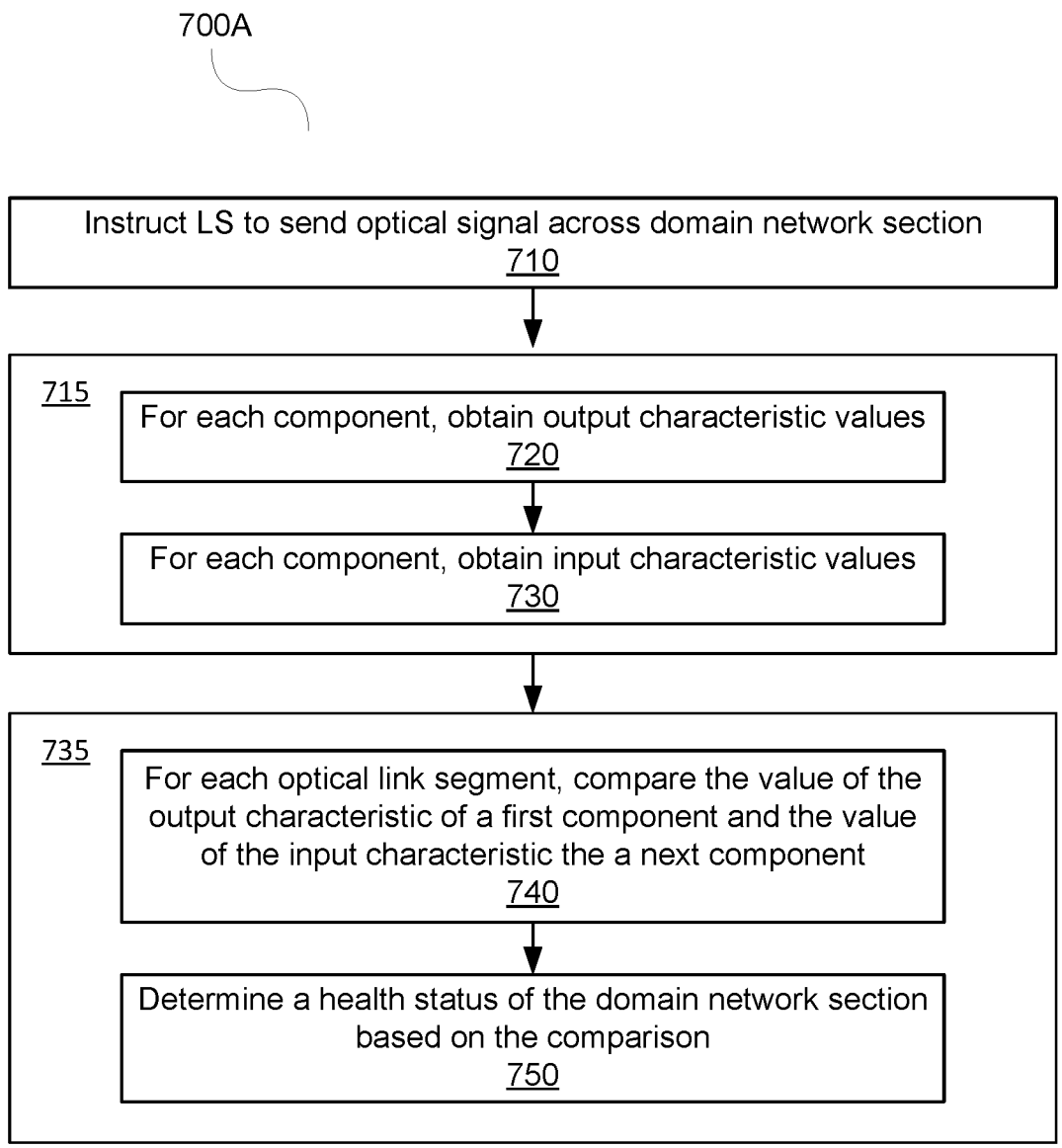
FIG. 7A illustrates, in a flowchart, an example of a method of determining that a domain network section is healthy, in accordance with embodiments of the present disclosure.

FIG. 7A illustrates, in a flowchart, an example of a method of determining a condition of a domain network (i.e., determining that a domain network section is "healthy") (700A), in accordance with embodiments of the present disclosure. The method (700A) may be performed by the controller 350 connected to the components of a domain network section 300. The controller 350 may be configured to instruct the LS 510 to send an optical signal (710) across the optical link 120 of the domain network section 300. The controller 350 may then obtain characteristic values of the optical signal at each component (715). For example, the controller 350 may obtain output characteristic values of the optical signals (720) output by each component (i.e., ROADM 400, amplifier 340) along the domain network section 300, and obtain input characteristic values of the optical signals (730) received by each component as well. The input and output characteristic values of the optical signal may comprise at least one of wavelength, polarization orientation, polarization mode dispersion (PMD), polarization dependent loss (PDL), state of polarization (SOP) changes, chromatic dispersion and power (i.e., optical power). Once the characteristic values are obtained (715), the controller 350 may determine the condition of the domain network section based on the characteristic values (735). For example, for each optical link segment along the optical link 120 from the ROADM 400a to the ROADM 400b, the controller 350 may compare the value of the output characteristic of the optical signal output by a component at an output end of the segment and the value of the input characteristic of the optical signal received by the component at the input end of the segment. These input and output characteristic readings may be per each optical component, such as ROADMs, amplifiers, etc. A health status (i.e., the condition) of each domain network section may be determined based on the comparison (750). For example, the health status may be set to "healthy" when the measured characteristics are within a specification (characteristic values) of the optical link. The health status may be set to "not healthy" when the measured characteristics are not within the specification of the optical link. Other steps may be added to the method (700A).

Figure 7B:
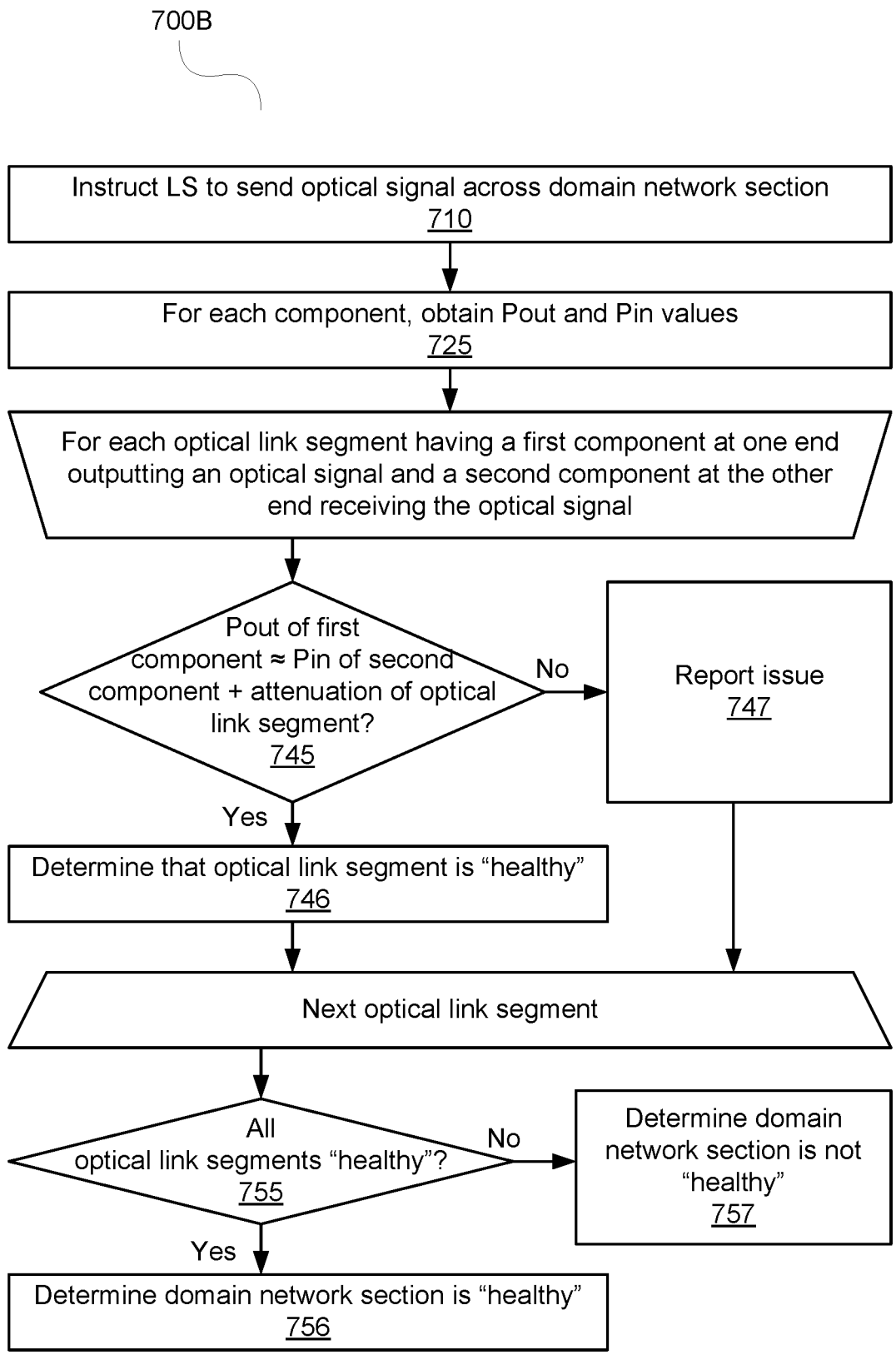
FIG. 7B illustrates, in a flowchart, another example of a method of determining that a domain network section is healthy, where the input and output characteristic values comprise input and output power, respectively, in accordance with an embodiment of the method of FIG. 7A.

FIG. 7B illustrates, in a flowchart, another example of a method of determining that a domain network section is healthy (700B) where the input and output characteristic values comprise input and output power, respectively, in accordance with an embodiment of the method of FIG. 7A. The method (700B) may be performed by the controller 350 connected to the components of a domain network section 300. The controller 350 may be configured to instruct the LS 510 to send an optical signal (710) across the optical link 120 of the domain network section 300. The controller 350 may then obtain values of the output power of the optical signals output by each component (i.e., ROADM 400, amplifier 340) along the domain network section 300, and obtain the values of the input power of the optical signals received by each component as well (725). For each optical link segment along the optical link 120 from the ROADM 400a to the ROADM 400b, the controller 350 may compare the value of the output power ($P_{out}$) of the optical signal output by a component at an output end of the segment and the value of the input of the optical signal received by the component at the input end of the segment. These input and output power readings may be per each optical component, such as ROADMs, amplifiers, etc. The optical path segment between the outputting component and the receiving component may be considered as being healthy (746) if the input power of the receiving component is approximately equal to the output power of the outputting component less an amount of attenuation attributable to that optical path segment (745). This can happen when amplifiers are "ON" and providing gain for the incoming signal. Otherwise (745), there may be an issue with respect to that optical path 120 segment that should be reported (747) and addressed (i.e., a component malfunction/degradation or there is a cut in the optical path/line segment). The power readings in step (745) may be performed per component and segment, and compared with a reference or expected value for optical link loss or amplifier gain. Steps (745) and either (746) or (747) are repeated for optical link segment between components along the optical link 120. Once all optical link segments are analyzed (steps (745) and either (746) or (747)), then if all optical link segments are healthy (755), the domain network section is determined as being healthy (756). Otherwise (755), the domain network section is not healthy (757) and includes a problem that requires intervention and further investigation. Other steps may be added to the method (700B).

As noted above, the input and output characteristic values of the optical signal may comprise at least one of polarization mode dispersion (PMD), polarization dependent loss (PDL), state of polarization (SOP) changes, chromatic dispersion and power (i.e., optical power). Method 700B illustrates an example when the input and output characteristics comprises optical power. Similar health status evaluations and determinations may be made when the input and output characteristics comprise PMD, PDL, SOP changes and chromatic dispersion. For example, when the input and output characteristics comprises PMD, the domain network section may be considered healthy when the measured PMD, which is the average of samples of differential group delay, agrees with the reference PMD measured when the link was provisioned or remains within a reference bound. When the input and output characteristics comprises PDL, the domain network section may be considered healthy when the measured PDL agrees with the reference PDL measured when the link was provisioned or is less than a set upper-bound for the link between the LS and the measurement point. When the input and output characteristics comprises SOP changes, the domain network section may be considered healthy when the rate of polarization changes for each wavelength is bounded by the rate changes measured during provisioning or a set reference. When the input and output characteristics comprise chromatic dispersion, the domain network section may be considered healthy when chromatic dispersion is within the specification of the link between the LS and the measurement point.

Figure 8A:
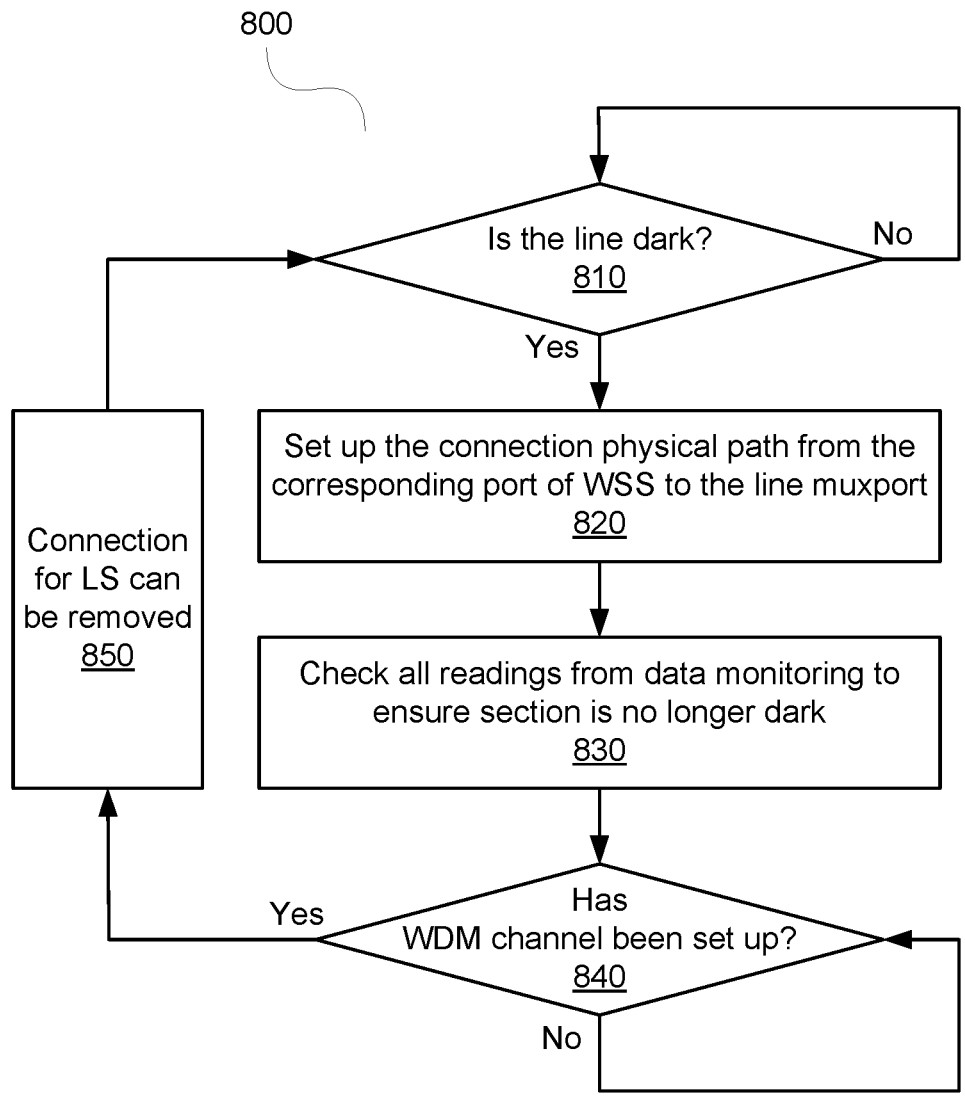
FIG. 8A illustrates, in a flowchart, an example of a method of determining that a new wavelength-division multiplexing (WDM) channel may be added to a domain network, in accordance with embodiments of the present disclosure.

FIG. 8A illustrates, in a flowchart, an example of a method of determining that a new wavelength-division multiplexing (WDM) channel may be added to a domain network (800), in accordance with embodiments of the present disclosure. The method may be performed by the controller 350 which may be configured to determine if the line is still dark (810) or suffering from performance degradation issues, such as unexpected high link loss, unreliable amplifier gain, high reflection, etc. (i.e., the line is not healthy). If the line is not dark (810) (i.e., if the line is healthy), then the controller 350 may periodically check again to determine if the line is dark (810). If the line is dark (810) (i.e., if the line is not healthy), then the controller 350 may set up the connection physical path from the corresponding port of the WSS 600 to the line mux port 504 (820). For example, the controller 350 may use the mux port 504 connected to the LS 610 to light the path. Alternatively, the controller 350 may use a switch to override one of the mux ports 504 to receive the LS signal. Next, the controller 350 may check all power readings (or other performance readings) from data monitoring to ensure that the section is no longer dark (830). If the WDM channel has not been set up (840), then the controller 350 periodically checks again to determine if the WDM channel has been set up (840). If the WDM channel has been set up (840), then the controller 350 may remove the connection for the LS (850) (i.e., remove the pilot light signal). Next, the controller 350 reverts back to monitoring if the line is dark (810) (i.e., if the line is not healthy). Other steps may be added to the method (800), such as lighting an entire domain network with the pilot light using the broadcast feature of ROADMs in the domain network. Method (800) steps described above may be repeated for each section in the domain network, thus confirming that the entire domain network is healthy. Other steps may be added to the method (800), including steps from methods (700A) and/or (700B).

FIG. 8B illustrates, in a flowchart, another example of determining that a new WDM channel may be added to a domain network (860), in accordance with embodiments of the present disclosure. The method (860) may be performed by the controller 350. The method (860) comprises the controller 350 configured to light up the domain network using a LS optical signal (865). For example, the controller 350 may instruct each LS 510 in each ROADM 400 to send the optical signal to a neighboring ROADM 400. Alternatively, the controller may instruct the LS 610 to send the optical signal from a centralized location to a ROADM mesh where each ROADM 400 comprises broadcast capabilities. As noted above, for any ROADM 400 that does not comprise broadcast capabilities, the controller 350 may instruct that ROADM 400 to perform routing functionality of the LS signal for a desired demultiplexer direction/port. Once the optical signal is sent (865), then the controller may, for each section in the domain network, check performance readings to ensure that the domain network section is healthy (870) (i.e., check that the performance readings are within pre-defined limits). An example of this step is further described below in FIG. 8C. Optionally, the controller 350 may instruct the LS to remove or stop sending (i.e., stop emitting) the LS optical signal when the WDM channel is set up (880). Other steps may be added to the method (860), including steps from methods (700A) and/or (700B).

FIG. 8C illustrates, in a flowchart, an example of step (870) of FIG. 8A. The method (870) comprises the controller 350 configured to, for each section in the domain network, tune the LS optical signal to a wavelength for that section (872). Next, the controller 350 may check the performance readings to ensure that the section is healthy for that wavelength (i.e., check that the performance readings are within pre-defined limits for that wavelength). Other substeps may be added to step (870), such as tuning the optical signal to a plurality of wavelengths for each section, and for each wavelength. Performance readings may be checked for each of the plurality of wavelengths to ensure that that section is healthy for one or more of the plurality of wavelengths. One of the wavelengths may be selected for use for the optical signal for that domain network segment.

A single light source (i.e., a centralized light source) may be configured to turn on a network (i.e., a pilot light to eliminate all dark sections). Both directions of a network domain may be supported when a broadcast feature is supported in a ROADM 400 for the corresponding wavelength used for the LS 510,610. The optical LS 510,610 may be customized for a variety of features to be supported across the networks. Depending on the desired scheme and or additional features, either continuous wave (CW) or modulated tones may be considered. At the ROADMs 400, the optical signal may be dropped for monitoring purposes and network health evaluations.

Figure 9:
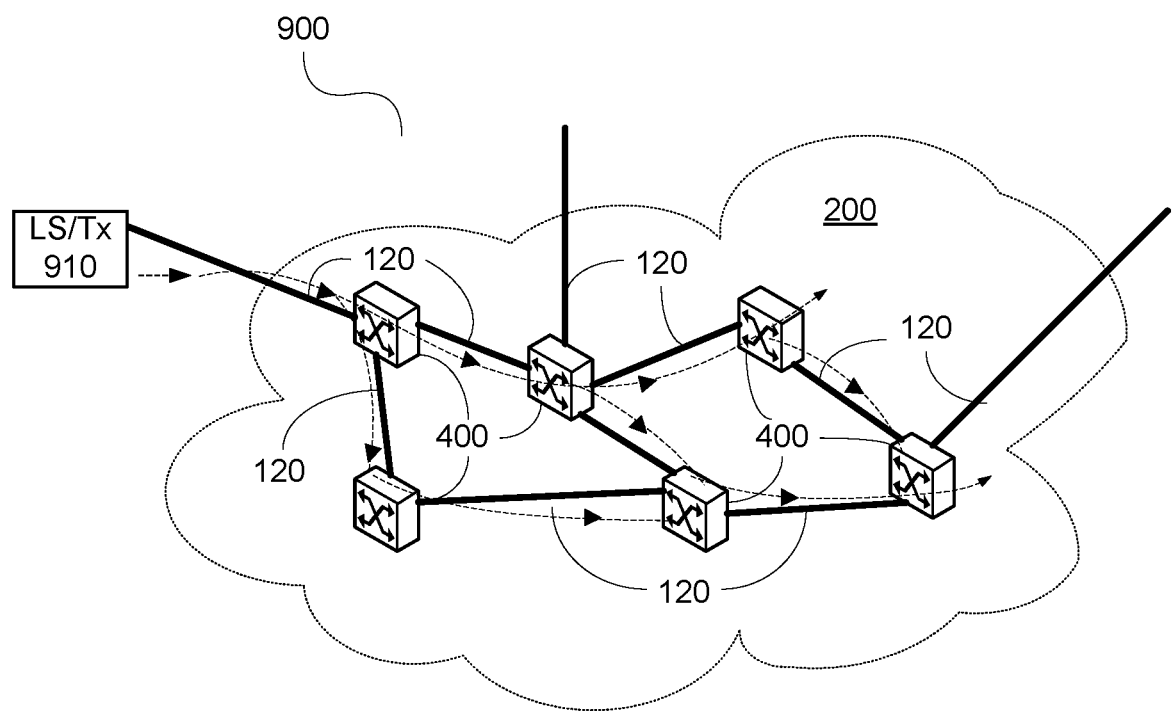
FIG. 9 illustrates, in a network diagram, another example of a domain network, in accordance with embodiments of the present disclosure.

FIG. 9 illustrates, in a network diagram, another example of a domain network 900, in accordance with embodiments of the present disclosure. The domain network 900 comprises a central LS 910 and one or more ROADMS 400 connected via optical paths 120. The centralized LS 910 may be configured to light all sections of the domain. Directional arrows show an example of light flow in one direction from the LS between ROADMs 400. It is understood the light may also flow in the reverse direction between and among ROADMs 400 by properly configuring ROADMs 400. The optical signal (i.e., pilot light) generated by the centralized LS 910 may be modulated or designed in such a way that its expected reference characteristics at (910) are known to all nodes 400 across the domain network 200. At different points of the domain network 200, the "lit" optical signal of the centralized LS 910 may be partially dropped for the purpose of monitoring and global/local network health evaluations. For example, power stability, amplifier behavior, etc., may be monitored and evaluated, and optical impairments such as chromatic dispersion (CD), polarization mode dispersion (PMD), polarization dependent loss (PDL) may be monitored and evaluated per section once all the measured monitoring data are available/pulled by the global network management (such as in transport-SDN (T-SDN) controllers. Pilot-tone modulated versions may also be used for measuring other parameters. The broadcast feature of the WSS-based ROADMs are available for low port count WSS such as 1×2, 1×4 and 1×9. Higher port WSS such as 1×20 may not support the broadcast feature which will affect the coverage of the network for lit sections. However, considering the physical topology and connectivity, ROADMs may be configured to support full coverage.

A centralized scheme (i.e., use of a central LS) may be enhanced to support added value to the monitoring and management layer (which may be implemented in the controller 350) where each node measures the quality of the received signal, i.e., tapping the signal for monitoring purposes. The LS 910 may be used for smart monitoring applications in addition to countering dark section issues. The smart monitoring includes functions that are not performed by traditional optical performance monitoring (OPM) circuitry. By branding the LS (via the broadcast feature of ROADMs) to many nodes and sections, such smart monitoring may assist with the measurement of link impairments, such as polarization mode dispersion (PMD), polarization dependent loss (PDL), chromatic dispersion (CD), state of polarization (SOP) changes, power changes, etc. The centralized LS 910 may be considered as a transmitter, Tx, that transmits an optical signal (CW or unmodulated) having a known specification (e.g., characteristic) including at least one of linewidth, dispersion, polarization (including polarization orientation), spectral shape, carried modulated test pattern, constant wavelength, etc. Each node (i.e., ROADM 400) may be equipped with receivers, Rx (not shown), to extract the corresponding metric quality of the received monitoring signal (i.e., CD, PMD, PDL, etc.). These receivers may be an external tool kit attached to a node, or may be embedded circuitry inside the node. Each Rx may perform measurements for all signals from all degrees or per degree, i.e., its functionality may be integrated in the ROADM 400. The receiver module may be in ROADMs 400 as well as amplifiers 340. Such receivers (Rx) impose negligible cost as compared to traditional receivers as they are performing data reception. They only perform analogue measurement of the desired specifications of the LS copy dropped at them.

Figure 10:
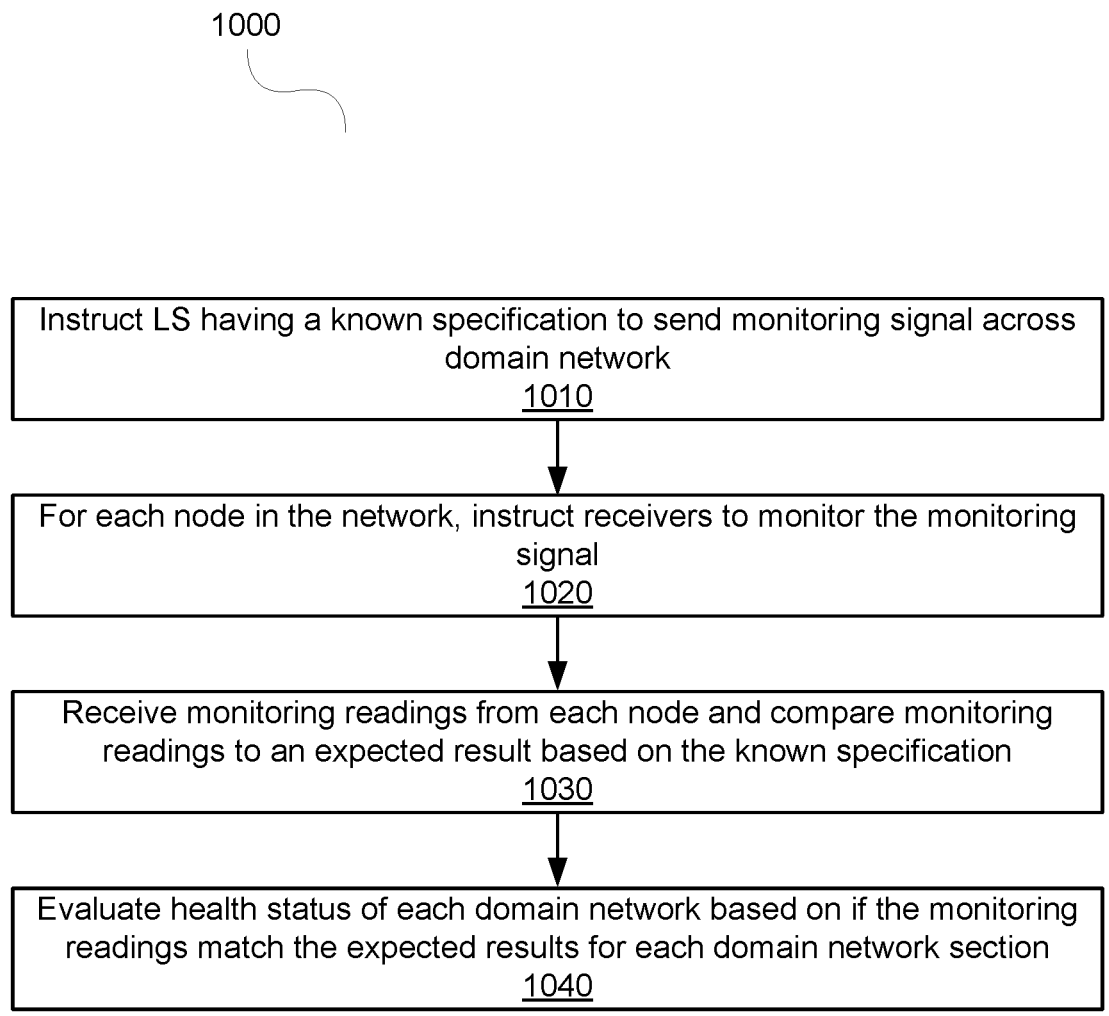
FIG. 10 illustrates, in a flowchart, an example of a method of monitoring the health of an optical network, in accordance with embodiments of the present disclosure.

FIG. 10 illustrates, in a flowchart, an example of a method of monitoring the health (i.e., monitoring a condition) of an optical network (1000), in accordance with embodiments of the present disclosure. The method (1000) may be performed by a monitoring and management layer implemented in a software defined network (SDN) controller (e.g., controller 350). The LS 910 may be set with a known specification (e.g., a characteristic). The known specification (characteristic) may include at least one of: linewidth, polarization, PMD, PDL, SOP, chromatic dispersion, power, etc. The method (1000) comprises the controller 350 configured to instruct the LS 910 (having the known specification/characteristic) to send (1010) a monitoring signal throughout the domain network 900. Next, the controller may instruct monitoring (1020) to be performed at all nodes in the optical network 900. For example, for each node in the optical network 900, receivers in the nodes may extract the quality of the received monitoring signal measuring all specifications. The quality of the received monitoring signal may include the signal's linewidth, polarization (e.g., polarization orientation), PMD, PDL, SOP, chromatic dispersion, power, etc. Next, the controller 350 may receive the readings (1030) from the nodes and compare the received monitoring readings to expected results based on the known specification. Next, the controller 350 may evaluate the health status (i.e., the condition) of each domain network section 300 in the domain network 900 (1040). A domain network section 300 is considered as healthy if the monitoring readings match or are within the expected results for each domain network section. The domain network section 300 is considered as not healthy if the monitoring readings do not match or are not within the expected results for each domain network section. The domain network section 300 may also be considered as not healthy when monitoring readings for that domain network provide a lower optical signal-to-noise ratio and/or a higher bit error rate. If all sections 300 are healthy, then the entire domain network 900 is healthy. Otherwise, the controller 350 may signal that a problem exists in the network 900 that requires intervention. The controller 350 may also indicate which network sections 300 are not healthy. Other steps may be added to the method (1000).

Using the central LS 910, the methods (700,800,1000) of confirming that a domain network section is healthy of FIGS. 7 and 8 may be extended to methods of confirming that portions of or an entire domain network 200 is healthy. The controller 350 may be configured to instruct the central LS 910 to send an optical signal across the entire domain network 200. Then the steps in methods (700,800,1000) pertaining to an entire domain network section 300 may be repeated for each domain network section 300 in a domain network 200. If all domain network sections 300 are healthy, then the entire domain network 200 is healthy. Thus, using a LS 510,610,910 to light optical links 120 allows for the methods (700,800,1000) to check the health status of the domain network section 300 and/or the entire domain network 200.

Figure 11:
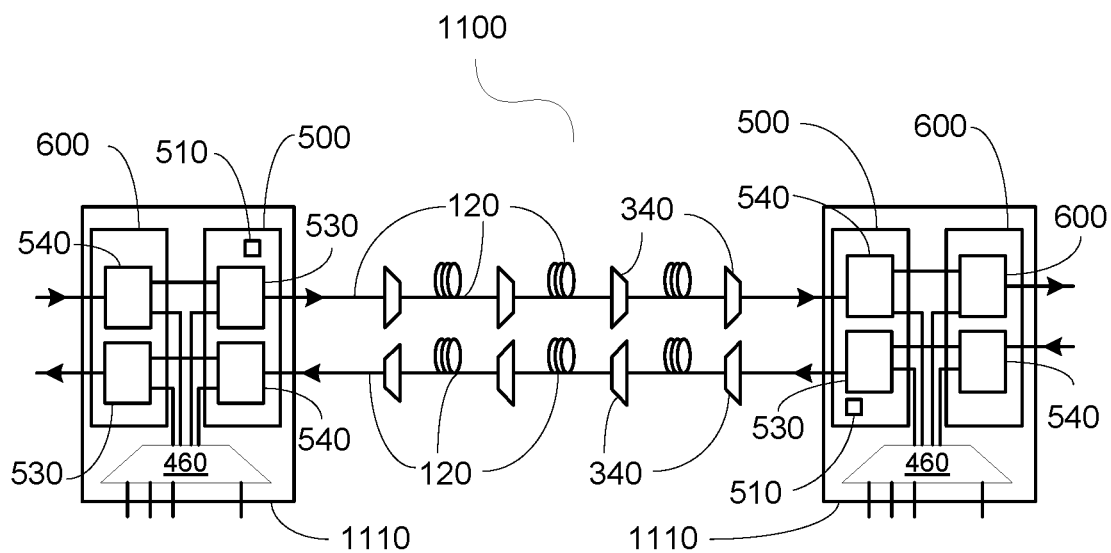
FIG. 11 illustrates, in a component diagram, another example of a domain network section, in accordance with embodiments of the present disclosure.

FIG. 11 illustrates, in a component diagram, another example of a domain network section 1100, in accordance with embodiments of the present disclosure. The domain network section 1100 comprises two two-degree ROADM nodes 1110, and at least one amplifier 340 along each optical path 120 connecting the ROADM nodes 1110. Two optical paths 120 are shown: one for each direction between the two degree ROADM nodes 1110. Each ROADM node 1110 comprises two WSS, and the add-drop bank 460. One of the ROADMs 400 in each node 1110 comprises a WSS 500 integrated with a LS 510. The other of the ROADMs 400 in each node 1110 comprises a WSS 600 without a LS. Each direction of optical signal flow has a ROADM 400 with a WSS 600 outputting along the optical path 120 towards a ROADM 400 with a WSS 500.

Figure 12:
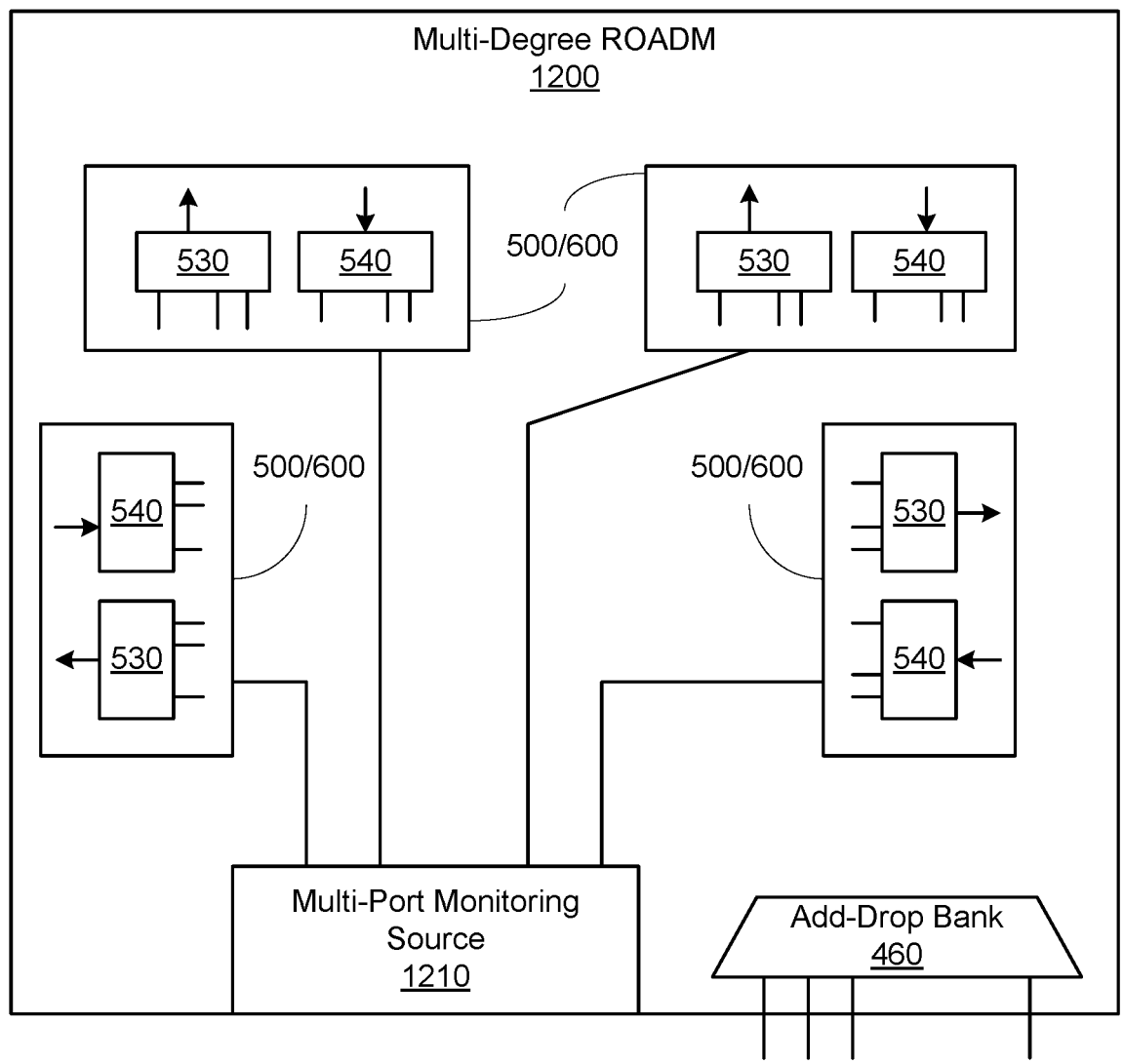
FIG. 12 illustrates, in a component diagram, an example of a multi-degree ROADM, in accordance with embodiments of the present disclosure.

FIG. 12 illustrates, in a component diagram, an example of a multi-degree ROADM 1200, in accordance with embodiments of the present disclosure. The multi-degree ROADM 1200 comprises four ROADMs 400, the add-drop bank 460 and a multi-port monitoring source 1210. Each ROADM 400 comprises a WSS 500,600 and a demultiplexer/splitter 540. This diagram is illustrated for WSS using splitter/combiner in their demultiplexer architecture. The same scheme is applicable to other WSS schemes. The multi-port monitoring source 1210 may support nodes with variable degrees such as four, eight, etc. A separate module may provide the support for the LS 910 per degree. Thus, the support for both existing legacy networks and future generations of ROADMs (CD, CDC, etc.) is simplified.

Embodiments of the present disclosure may be further enhanced for fault recovery scenarios. Depending on the redundancy required, multiple access points may be configured to inject the LS (CW, pilot-tones, etc.) and provide a diversified lit light spectrum across the network. Each LS may use a different set of wavelengths (i.e., multi-wavelength source), bands, or sub-bands. Multiple LSs may share the same band considered for lighting purposes. They may also use mutually exclusive parts of the spectrum for the purpose of redundancy as well as higher reliability and more accurate monitoring of the network.

Figure 13:
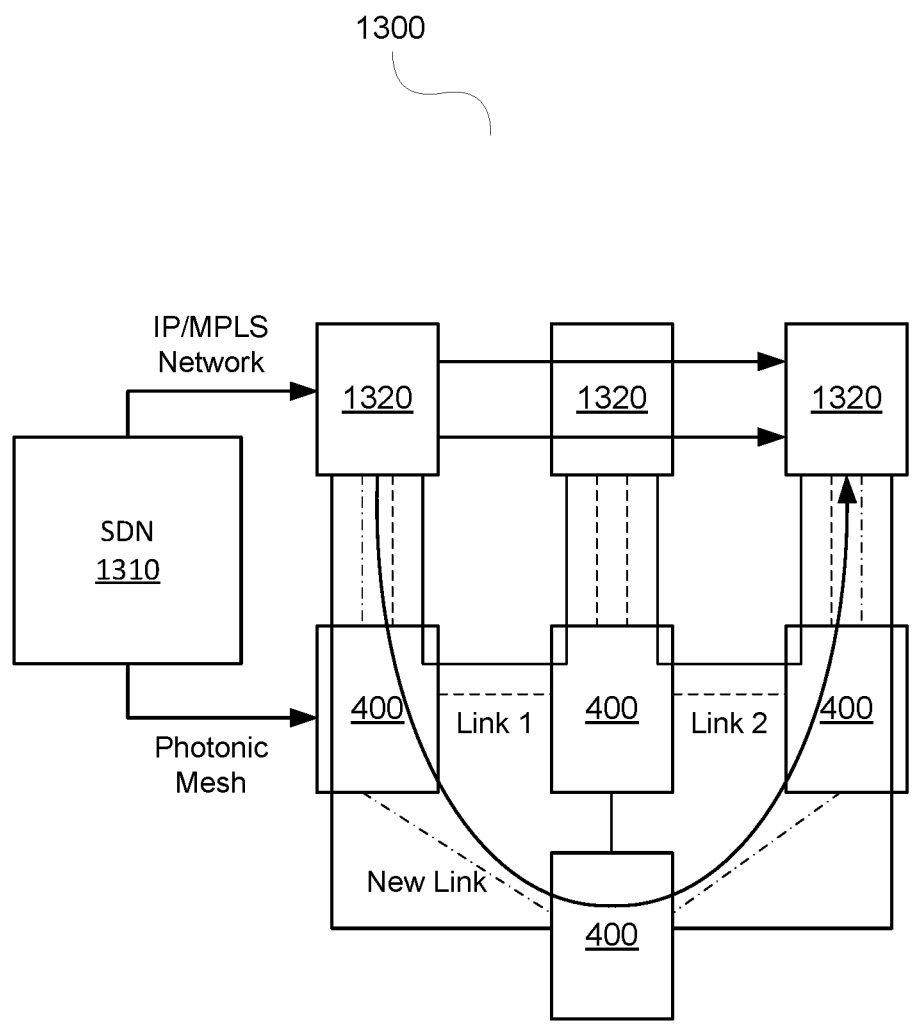
FIG. 13 illustrates, in a component diagram, an example of service provisioning, in accordance with embodiments of the present disclosure.

FIG. 13 illustrates, in a component diagram, an example of service provisioning 1300, in accordance with embodiments of the present disclosure. A software defined network (SDN) 1300 may send signaling to an IP/MPLS network 1320 and to a photonic mesh of ROADMs 400. WDM channels may be added or deleted on dark sections, especially during an upgrade when new degrees/lines are added. Dynamic service provisioning/upgrade may take place with transport-SDN. As the network is lit, issues and performance related metrics are known to the management layer. Hence, proper routing and wavelength assignment may be used.

Figure 14:
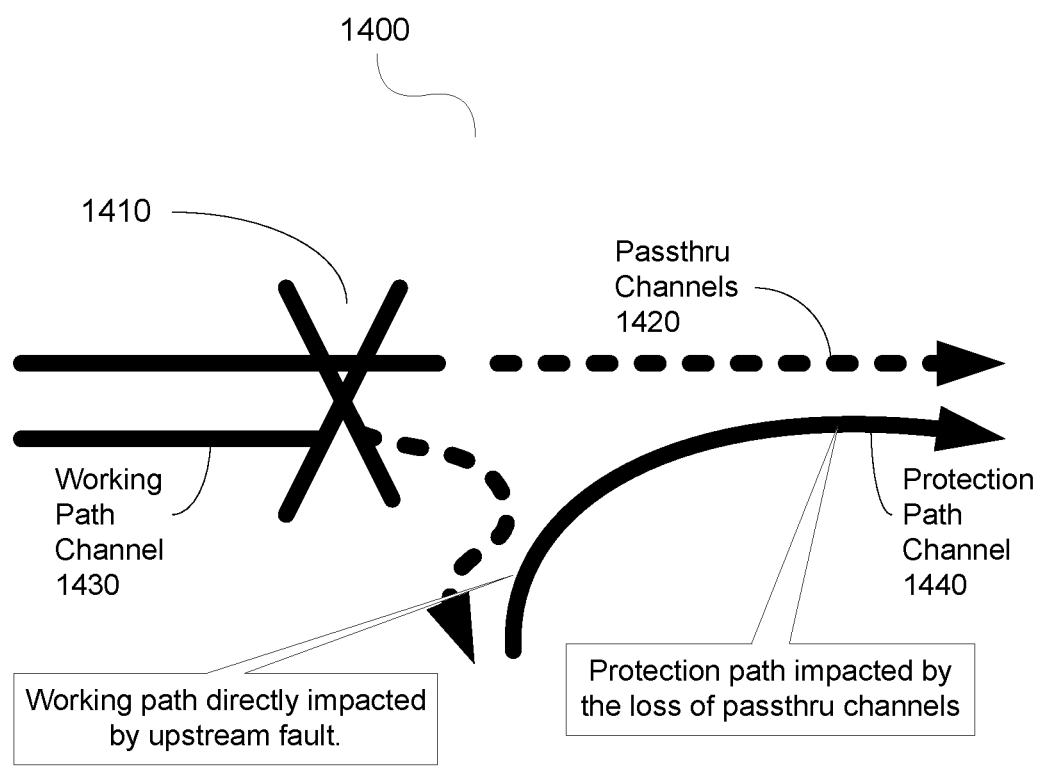
FIG. 14 illustrates, in a component diagram, an example of a network restorations and reversions in accordance with embodiments of the present disclosure.

FIG. 14 illustrates, in a component diagram, an example of a network restorations and reversions 1400, in accordance with embodiments of the present disclosure. Such network restorations and reversions may take place during network failure 1410 (e.g., a fiber cut, component malfunction, etc.) where a WDM channel topology has to be reconfigured. FIG. 14 shows the working path channels 1430 directly impacted by the upstream fault 1410, and the protection path channel 1440 impacted by the loss of passthru channels 1420 cause by the upstream fault 1410. After the cause of the failure is fixed, and traffic is re-routed to the original path, the teachings of the present disclosure may be used to ensure that the fixed topology is not dark.

Figure 15:
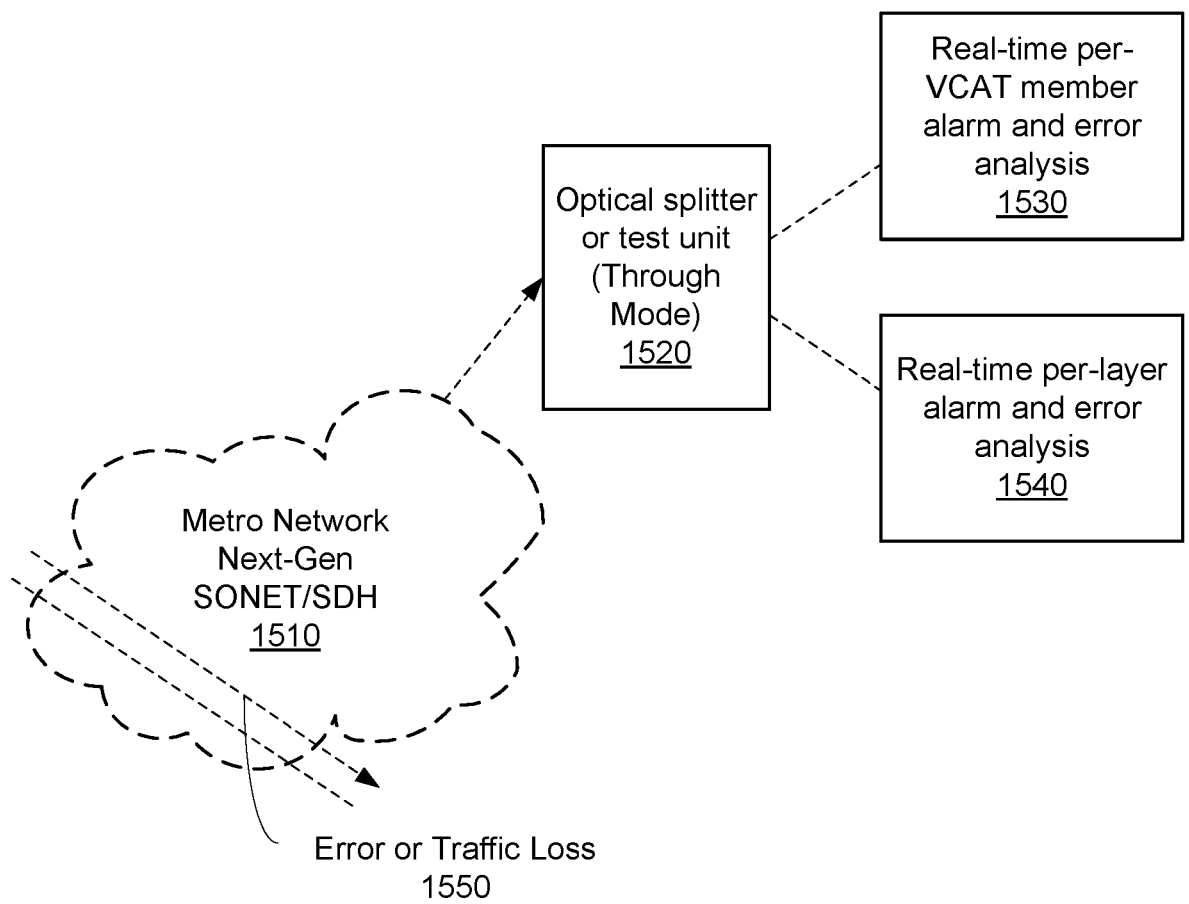
FIG. 15 illustrates, in a component diagram, an example of proactive fault diagnosis and monitoring, in accordance with embodiments of the present disclosure.

FIG. 15 illustrates, in a component diagram, an example of proactive fault diagnosis and monitoring 1500, in accordance with embodiments of the present disclosure. Predictive approaches for fault identification may take place by using a probe (e.g., monitoring) LS wavelength (centralized or distributed) that not only lights the section but also provides valuable information regarding the optical link 120. This assists with providing a minimized operational cost (OPEX) during upgrades or fault recovery (e.g., fiber repair, etc.). In-service upgrades as well as maintenance activities are included in proactive fault diagnosis and monitoring. FIG. 15 shows a network 1510 (such as a metro network next generation synchronous optical networking (SONET)/synchronous digital hierarchy (SDH) having errors or traffic loss 1550. An optical splitter or test unit 1520 may obtain monitoring readings from nodes in the network 1510 and send them to a controller that may issue reports such as a real-time per-virtual concatenation (VCAT) member alarm and error analysis report 1530 and a real-time per-layer alarm and error analysis report 1540.

Figure 16:
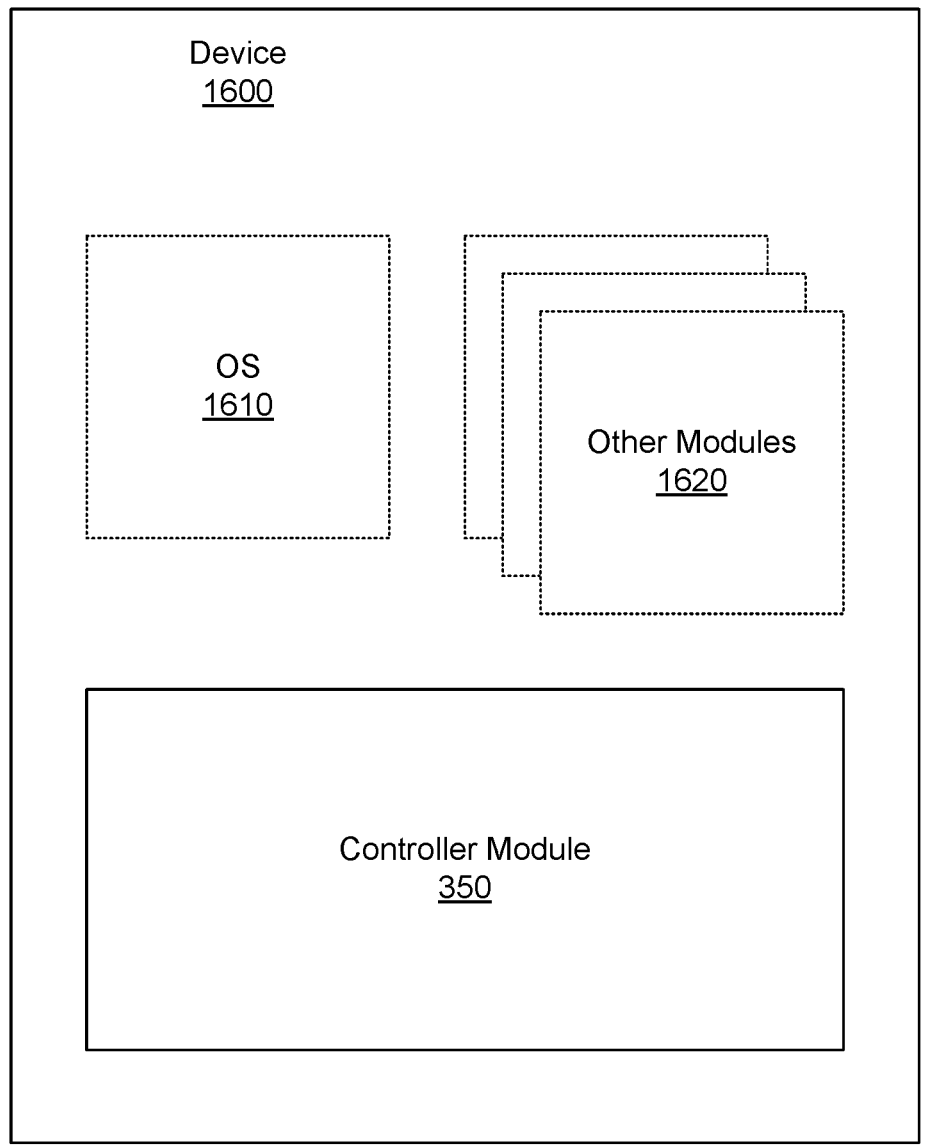
FIG. 16 illustrates, in a component diagram, an example of a device comprising the controller, in accordance with embodiments of the controller.

FIG. 16 illustrates, in a component diagram, an example of a device 1600 comprising the controller 350, in accordance with embodiments of the controller 350. The device 1600 may comprise the controller 350, and may optionally comprise an operating system 1610 and other modules 1620 for other functionalities of the device 1600. The controller 350 may perform steps in methods (700), (800), and (1000), described above.

Figure 17:
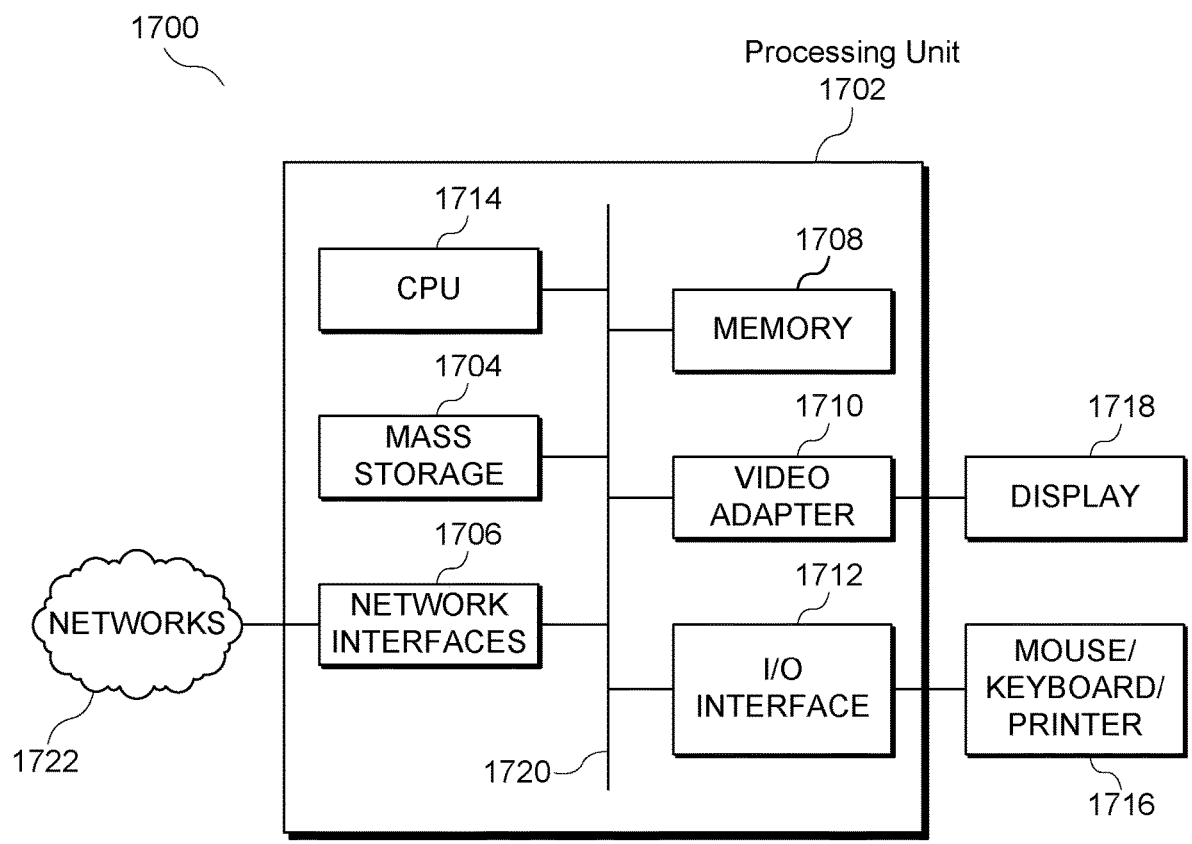
FIG. 17 illustrates, in a block diagram, a computing system that may be used for implementing the devices and methods disclosed herein.

FIG. 17 illustrates, in a block diagram, a computing system 1700 that may be used for implementing some of the devices and methods disclosed herein. Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 1700 includes a processing unit 1702. The processing unit 1702 includes a central processing unit (CPU) 1714, memory 1708, and may further include a mass storage device 1704, a video adapter 1710, and an I/O interface 1712 connected to a bus 1720.

The bus 1720 may be one or more of any type of several bus architectures including a memory bus or memory controller, a peripheral bus, or a video bus. The CPU 1714 may comprise any type of electronic data processor. The memory 1708 may comprise any type of non-transitory system memory such as static random access memory (SRAM), dynamic random access memory (DRAM), synchronous DRAM (SDRAM), read-only memory (ROM), or a combination thereof. The memory 1708 may include ROM for use at boot-up, and DRAM for program and data storage for use while executing programs.

The mass storage 1704 may comprise any type of non-transitory storage device configured to store data, programs, and other information and to make the data, programs, and other information accessible via the bus 1720. The mass storage 1704 may comprise, for example, one or more of a solid state drive, hard disk drive, a magnetic disk drive, or an optical disk drive.

The video adapter 1710 and the I/O interface 1712 provide interfaces to couple external input and output devices to the processing unit 1702. As illustrated, examples of input and output devices include a display 1718 coupled to the video adapter 1710 and a mouse/keyboard/printer 1716 coupled to the I/O interface 1712. Other devices may be coupled to the processing unit 1702, and additional or fewer interface cards may be utilized. For example, a serial interface such as universal serial bus (USB) (not shown) may be used to provide an interface for an external device.

The processing unit 1702 may also include one or more network interfaces 1706, which may comprise wired links, such as an Ethernet cable, and/or wireless links to access nodes or different networks. The network interfaces 1706 allow the processing unit 1702 to communicate with remote units via the networks. For example, the network interfaces 1706 may provide wireless communication via one or more transmitters/transmit antennas and one or more receivers/receive antennas. The processing unit 1702 may be coupled to a local-area network 1722 or a wide-area network for data processing and communications with remote devices, such as other processing units, the Internet, or remote storage facilities.

Unless defined otherwise, all technical and scientific terms used herein have the same meaning as commonly understood by one of ordinary skill in the art to which this invention belongs.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A reconfigurable optical add-drop multiplexer (ROADM) comprising:
   a controller interface for receiving instructions from a controller;
   a wavelength selective switch (WSS) for receiving a combined input optical signal and for outputting a WSS output signal; and
   an add-drop bank for receiving an optical signal from the combined input optical signal;
   wherein a light source is integrated in the WSS or the add-drop bank for sending an always present pilot optical signal having a known characteristic, the always present pilot optical signal having sufficient power to maintain operation of an amplifier in a link of the optical network between the ROADM and a subsequent ROADM;
   wherein the ROADM is configured to receive instructions from a network controller for monitoring a known characteristic of an always present received optical signal, the always present received optical signal associated with the link, the link including an optical network section that would be dark except for the presence of the always present received optical signal, the always present received optical signal having a wavelength in an operating window of the amplifier; and transmitting readings associated with the always present received optical signal to the network controller.

2. The ROADM as claimed in claim 1, wherein the always present pilot optical signal is configured to light the link from the ROADM to an optical network component along the link.

3. The ROADM as claimed in claim 1, wherein the always present pilot optical signal is a monitoring signal having a pre-defined characteristic that can be measured when the monitoring signal sent by the ROADM is received at an optical component along the link and compared to an expected receive signal specification of the monitoring signal.

4. The ROADM as claimed in claim 3, wherein the pre-defined characteristic comprises at least one of: a polarization orientation, a spectral shape and a carried modulated test pattern.

5. A method of determining a condition of a domain network, the method comprising:
    sending an always present optical signal having sufficient power to maintain operation of an amplifier in a section of the domain network, the section that would be dark except for the presence of the always present optical signal, the always present optical signal having a wavelength in an operating window of the amplifier;
    obtaining characteristic values of the always present optical signal at a component of a link of the section, the characteristic values including at least one of: polarization mode dispersion, polarization dependent loss, state of polarization changes and chromatic dispersion; and
    performing health monitoring by determining the condition of the section based on the characteristic values.

6. The method as claimed in claim 5, wherein determining the condition of the section comprises determining that the characteristic values are within corresponding pre-defined limits.

7. The method as claimed in claim 5, wherein:
    the characteristic values comprise output power and input power; and
    determining the condition of the section comprises determining that the output power of the always present optical signal at the component is approximately equal to the input power of the always present optical signal at a next component along an optical path segment of the link, less an amount of attenuation of the optical path segment.

8. The method as claimed in claim 5, wherein determining the condition of the section comprises determining that the characteristic values are not within corresponding pre-defined limits.

9. The method as claimed in claim 5, wherein:
    the characteristic values comprise output power and input power;
    determining the condition of the section comprises determining that the output power of the always present optical signal at the component is not approximately equal to the input power of the always present optical signal at a next component along an optical path segment of the link, less an amount of attenuation of the optical path segment; and
    wherein the output power depends on the section's technology, operating requirements of the component, and a loss budget of the link.

10. A method of determining that a wavelength-division multiplexing (WDM) channel may be added, the method comprising:
    sending an always present optical signal having sufficient power to maintain operation of an amplifier in a section of a domain network;
    tuning the always present optical signal to a wavelength of an operating window of the amplifier, the domain network including an optical network section that would be dark except for the presence of the always present optical signal; and
    checking that performance readings of the one of a plurality of sections are within pre-defined limits for the wavelength.

11. A method of monitoring a condition of an optical network having a plurality of network sections, the method comprising:
    sending an always present optical signal having sufficient power to maintain operation of an amplifier in the optical network;
    instructing receivers in nodes in the optical network to monitor a received always present optical signal, the received always present optical signal having a known characteristic and a wavelength in an operating window of the amplifier, wherein a link of the optical network would be dark except for the presence of the always present optical signal;
    receiving monitoring readings from the nodes and comparing the monitoring readings to an expected result based on the known characteristic; and
    evaluating a condition of each optical network section by comparing the monitoring readings to pre-defined limits for each optical network section.

12. The method as claimed in claim 11, wherein:
    the known characteristic comprises at least one of: polarization mode dispersion, polarization dependent loss, state of polarization changes, chromatic dispersion and power.

13. The method as claimed in claim 11, wherein the monitoring readings comprise at least one of: an optical signal-to-noise ratio and a bit error rate.

14. The ROADM of claim 1 further comprising a second amplifier for amplifying the power level of the always present pilot optical signal.

15. A network controller comprising:
    a network interface for communicating with network nodes in an optical network having a plurality of network sections;
    a processor;
    a memory including instructions executable in the processor to cause the network controller to:
        instruct receivers in nodes in the optical network to monitor an always present optical signal they receive, the always present optical signal having:
            a known characteristic; and
            a wavelength in an operating window of the optical network, wherein the link comprises section that would be dark except for the presence of the always present received optical signal; and
            a power level sufficient to maintain operation of a component of one of the nodes;
        receive monitoring readings from the nodes and compare the monitoring readings to an expected result based on the known characteristic; and evaluate a condition of each network section by comparing the monitoring readings to pre-defined limits for each network section.

* * * * *